United States Patent
Kon et al.

(10) Patent No.: US 8,011,588 B2
(45) Date of Patent: Sep. 6, 2011

(54) ELECTRONIC WALLET DEVICE AND METHOD OF USING ELECTRONIC VALUE

(75) Inventors: Takayasu Kon, Tokyo (JP); Yasunori Kamada, Kanagawa (JP); Takashi Fukushima, Tokyo (JP); Yoichiro Sako, Tokyo (JP); Miki Abe, Kanagawa (JP); Masamichi Asukai, Kanagawa (JP); Taiji Ito, Kanagawa (JP); Akane Sano, Tokyo (JP); Mitsuru Takehara, Tokyo (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 12/229,060

(22) Filed: Aug. 19, 2008

(65) Prior Publication Data

US 2009/0050687 A1 Feb. 26, 2009

(30) Foreign Application Priority Data

Aug. 23, 2007 (JP) ................. 2007-217478

(51) Int. Cl.
*G06K 7/00* (2006.01)
(52) U.S. Cl. ................ 235/486; 235/472.01; 235/380
(58) Field of Classification Search .................. 235/375, 235/380, 382, 385, 472.01, 486
See application file for complete search history.

(56) References Cited

U.S. PATENT DOCUMENTS

| | | | |
|---|---|---|---|
| 5,221,838 A * | 6/1993 | Gutman et al. | ............... 235/379 |
| 5,778,067 A | 7/1998 | Jones | |
| 7,269,445 B2 | 9/2007 | Natsuno et al. | |
| 2004/0035930 A1 | 2/2004 | Arisawa | |
| 2009/0050686 A1 | 2/2009 | Kon et al. | |
| 2009/0050688 A1 | 2/2009 | Kon et al. | |
| 2009/0050689 A1 | 2/2009 | Sako et al. | |
| 2009/0052695 A1 | 2/2009 | Yamada et al. | |

FOREIGN PATENT DOCUMENTS

| | | |
|---|---|---|
| EP | 1028398 A2 | 8/2000 |
| EP | 1560172 A1 | 8/2005 |
| EP | 1603062 A1 | 12/2005 |
| EP | 1732032 A2 | 12/2006 |
| EP | 2028627 A1 | 2/2009 |
| FR | 2810435 A | 12/2001 |
| JP | 11-509712 A | 8/1999 |
| JP | 2000-076399 A | 3/2000 |
| JP | 2000-123138 A | 4/2000 |
| JP | 2000-259901 A | 9/2000 |
| JP | 2002-197518 A | 7/2002 |

(Continued)

*Primary Examiner* — Karl D. Frech
(74) *Attorney, Agent, or Firm* — Wolf, Greenfield & Sacks, P.C.

(57) ABSTRACT

There is provided an electronic wallet device using electronic value concerning a prescribed service by means of a non-contact type IC card capable of non-contact communication with an external unit, which includes a holding section to hold a plurality of non-contact type IC cards, an external communication antenna to perform non-contact communication with the external unit, a card communication antenna to perform non-contact communication with the non-contact type IC cards held in the holding section, a value storing section capable of storing electronic value, and a control section to receive a transaction request concerning the service from the external unit via the external communication antenna and, in response to the transaction request, transfer electronic value between the value storing section and at least one of the plurality of non-contact type IC cards via the card communication antenna.

7 Claims, 10 Drawing Sheets

FOREIGN PATENT DOCUMENTS

| | | |
|---|---|---|
| JP | 2003-187167 A | 7/2003 |
| JP | 2003-187173 A | 7/2003 |
| JP | 2003-256751 A | 9/2003 |
| JP | 2003-330898 A | 11/2003 |
| JP | 2004-005734 A | 1/2004 |
| JP | 2004-139604 A | 5/2004 |
| JP | 2004-192476 A | 7/2004 |
| JP | 2004-243011 A | 9/2004 |
| JP | 2005-011044 A | 1/2005 |
| JP | 2005-242444 A | 9/2005 |
| JP | 2005-242594 A | 9/2005 |
| JP | 2005-266879 A | 9/2005 |
| JP | 2005-293444 A | 10/2005 |
| JP | 2005-312925 A | 11/2005 |
| JP | 2006-003932 A | 1/2006 |
| JP | 2006-073028 A | 3/2006 |
| JP | 2006-155045 A | 6/2006 |
| JP | 2006-318453 A | 11/2006 |
| WO | WO02-061572 A1 | 8/2002 |
| WO | WO 2005/027035 A1 | 3/2005 |
| WO | WO 2005/093667 A1 | 10/2005 |

* cited by examiner

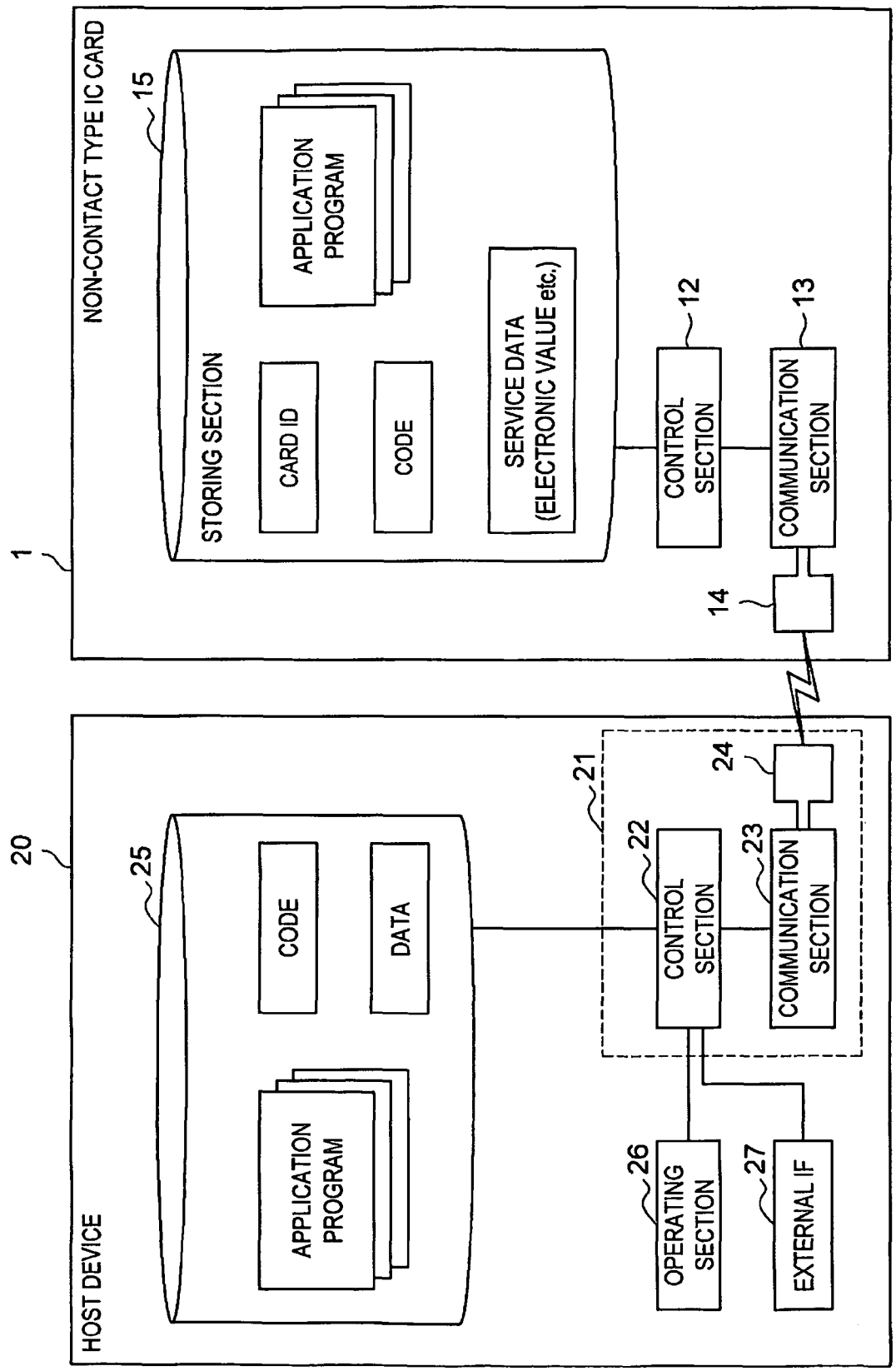

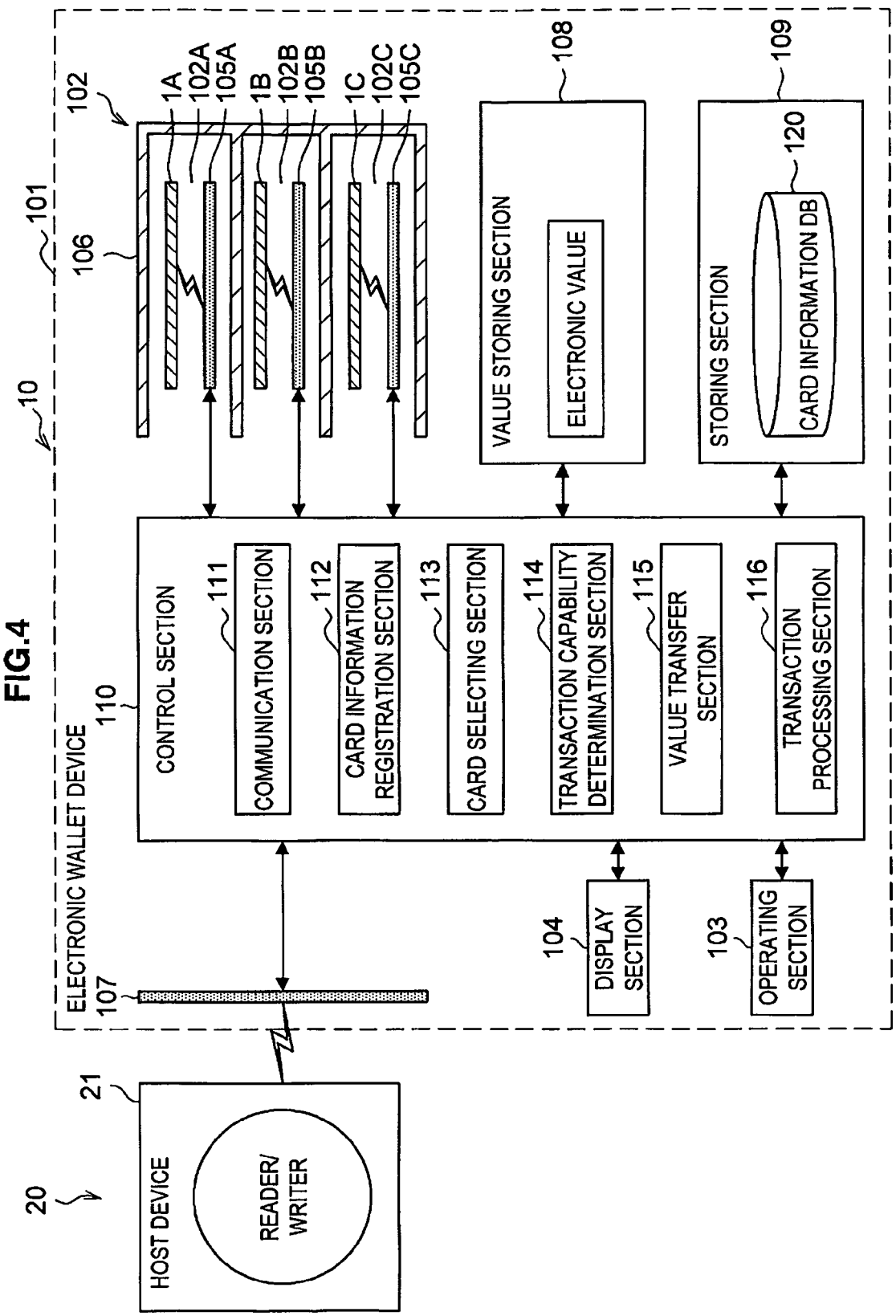

ELECTRONIC WALLET DEVICE AND METHOD OF USING ELECTRONIC VALUE

CROSS REFERENCES TO RELATED APPLICATIONS

The present invention contains subject matter related to Japanese Patent Application JP 2007-217478 filed in the Japan Patent Office on Aug. 23, 2007, the entire contents of which being incorporated herein by reference.

FIELD OF THE INVENTION

The present invention relates to an electronic wallet device and a method of using electronic value.

DESCRIPTION OF THE RELATED ART

Services using a non-contact type IC card which includes an antenna coil and an IC chip are becoming increasingly widely available in daily use. A non-contact type IC card can perform data communication when it is simply held over a reader/writer of a host device without being taken out of a wallet, an IC card holder or the like, thus being highly convenient. Therefore, such a non-contact type IC card is widely used in IC card systems which provide various services such as an electronic money service and a transportation ticket gate service, for example.

An electronic money service involves a large variety of services, and there are wide-ranging kinds of non-contact type IC cards that are available for respective services (which are hereinafter referred to as "electronic money card"). Thus, it is necessary for a user to have a plurality of electronic money cards which correspond to respective services in order to use different electronic money services. Further, with the advent of multi-application IC cards, uses increasingly have a plurality of non-contact type IC cards with an electronic money function.

Accordingly, users increasingly carry a plurality of non-contact type IC cards. Generally, a user carries a plurality of non-contact type IC cards collectively using a wallet, a bag, an IC card holder and so on. However, if a plurality of non-contact type IC cards which are carried collectively are held over a reader/writer at the same time, the plurality of non-contact type IC cards exist within a transmission range of a reader/writer (within an effective area of an electromagnetic wave emitted by a reader/writer). In such a case, antenna coils of the plurality of non-contact type IC cards magnetically couple with each other, causing a large deviation from the original resonance frequency to disable transmission of any non-contact type IC cards. As a technique that addresses such an issue, an IC card holder in which an anti-interference part is placed between two non-contact type IC cards is proposed in Japanese Unexamined Patent Application Publication No. 2005-11044, for example.

SUMMARY OF THE INVENTION

When a user has a plurality of electronic money cards and uses a plurality of electronic money services with pre-paid electronic money, for example, an electronic money value is divided into respective electronic money cards. Therefore, in an existing electronic money system, there are cases where electronic money cannot be used for the payment of a product or the like because the value of each single electronic money card is insufficient in spite that the total value (balance) of a plurality of electronic money cards is sufficient. Besides such an issue, there are various issues such as that it is inconvenient for a user to manage the values of electronic money cards for a plurality of electronic money services.

In light of the foregoing, it is desirable to provide a novel and improved electronic wallet device and a method of using electronic value which manage electronic value that are stored in a plurality of non-contact type IC cards collectively and flexibly cope with the use of electronic value or the like.

According to an embodiment of the present invention, there is provided an electronic wallet device using electronic value concerning a prescribed service by means of a non-contact type IC card capable of non-contact communication with an external unit, which includes a holding section to hold a plurality of non-contact type IC cards, an external communication antenna to perform non-contact communication with the external unit, a card communication antenna to perform non-contact communication with the plurality of non-contact type IC cards held in the holding section, a value storing section capable of storing electronic value, and a control section to receive a transaction request concerning the service from the external unit via the external communication antenna and, in response to the transaction request, transfer electronic value between the value storing section and at least one of the plurality of non-contact type IC cards via the card communication antenna.

In this configuration, the value storing section which functions as a cache for using electronic value by each non-contact type IC card is placed inside the electronic wallet device. Thus, when performing a transaction of electronic value for a prescribed service between the electronic wallet device and the external unit, the electronic wallet device can transfer electronic value between the value storing section and the non-contact type IC card according to the transaction request from the external unit. It is thereby possible to transfer the electronic value stored in the value storing section to the non-contact type IC card by which the electronic value is to be used or transfer the electronic value stored in one non-contact type IC card to another non-contact type IC card via the value storing section. This enables management of electronic value that are stored in a plurality of non-contact type IC cards collectively, thereby flexibly coping with the use of the electronic value.

Further, electronic value stored in each non-contact type IC card may be electronic value specific to a service to which each non-contact type IC card corresponds, and electronic value stored in the value storing section may be electronic value common to a plurality of services. It is thereby possible to transfer the common electronic value stored in the value storing section to a non-contact type IC card corresponding to an arbitrary service and use the electronic value as unique electronic value for the service to which the non-contact type IC card corresponds. Further, it is possible to exchange electronic value not only between the non-contact type IC cards corresponding to the same kind of service but also between the non-contact type IC cards corresponding to different kinds of services via the value storing section. This significantly increases convenience for users having a plurality of non-contact type IC cards.

Furthermore, the control section may transfer electronic value stored in the plurality of non-contact type IC cards to the value storing section and add up the transferred electronic value as electronic value common to the plurality of services. It is thereby possible to add up the electronic value stored in the plurality of non-contact type IC cards corresponding to the same or different kinds of services in the value storing section and use them as electronic value for an arbitrary service.

The control section may receive a payment request of a prescribed amount of electronic value from the external unit via the external communication antenna and, in response to the payment request, transfer electronic value from the value storing section to a non-contact type IC card selected from the plurality of non-contact type IC cards and control the selected non-contact type IC card to pay the prescribed amount of electronic value to the external unit. The electronic wallet device can thereby transfer electronic value between the value storing section and the non-contact type IC card according to the payment request from the external unit. It is thereby possible to transfer the electronic value stored in the value storing section to the non-contact type IC card which can pay the electronic value according to the requested payment amount and pay the prescribed amount of electronic value from the non-contact type IC card to the external unit, thereby flexibly coping with the payment of electronic value.

Further, the control section may determine whether electronic value stored in the selected non-contact type IC card is equal to or larger than the prescribed amount and, if the electronic value is smaller than the prescribed amount, transfer electronic value stored in the value storing section to the selected non-contact type IC card. It is thereby possible to determine whether electronic value is insufficient in the selected non-contact type IC card and, if it is insufficient, transfer electronic value from the value storing section to the selected non-contact type IC card, thereby enabling the payment.

Furthermore, the control section may determine whether electronic value stored in the selected non-contact type IC card is equal to or larger than the prescribed amount and, if the electronic value is smaller than the prescribed amount, transfer electronic value stored in another non-contact type IC card to the selected non-contact type IC card via the value storing section. It is thereby possible to determine whether electronic value is insufficient in the selected non-contact type IC card and, if it is insufficient, transfer electronic value from another non-contact type IC card to the selected non-contact type IC card via the value storing section, thereby enabling the payment.

According to another embodiment of the present invention, there is provided a method of using electronic value concerning a prescribed service in an electronic wallet device including a holding section to hold a plurality of non-contact type IC cards capable of non-contact communication with an external unit, an external communication antenna to perform non-contact communication with the external unit, a card communication antenna to perform non-contact communication with the plurality of non-contact type IC cards held in the holding section, and a value storing section capable of storing electronic value. The method includes the steps of receiving a transaction request concerning the service from the external unit via the external communication antenna, and transferring electronic value between the value storing section and at least one of the plurality of non-contact type IC cards via the card communication antenna in response to the transaction request.

According to the embodiments of the present invention described above, it is possible to manage electronic value that are stored in a plurality of non-contact type IC cards collectively and flexibly cope with the use of electronic value or the like.

BRIEF DESCRIPTION OF THE DRAWINGS

FIG. 3 is a block diagram showing an example of the configuration of a reader/writer of a host device and a non-contact type IC card in an IC card system according to the embodiment.

FIG. 4 is a block diagram showing the schematic configuration of the electronic wallet device according to the embodiment.

DETAILED DESCRIPTION OF THE PREFERRED EMBODIMENTS

Figure 1:
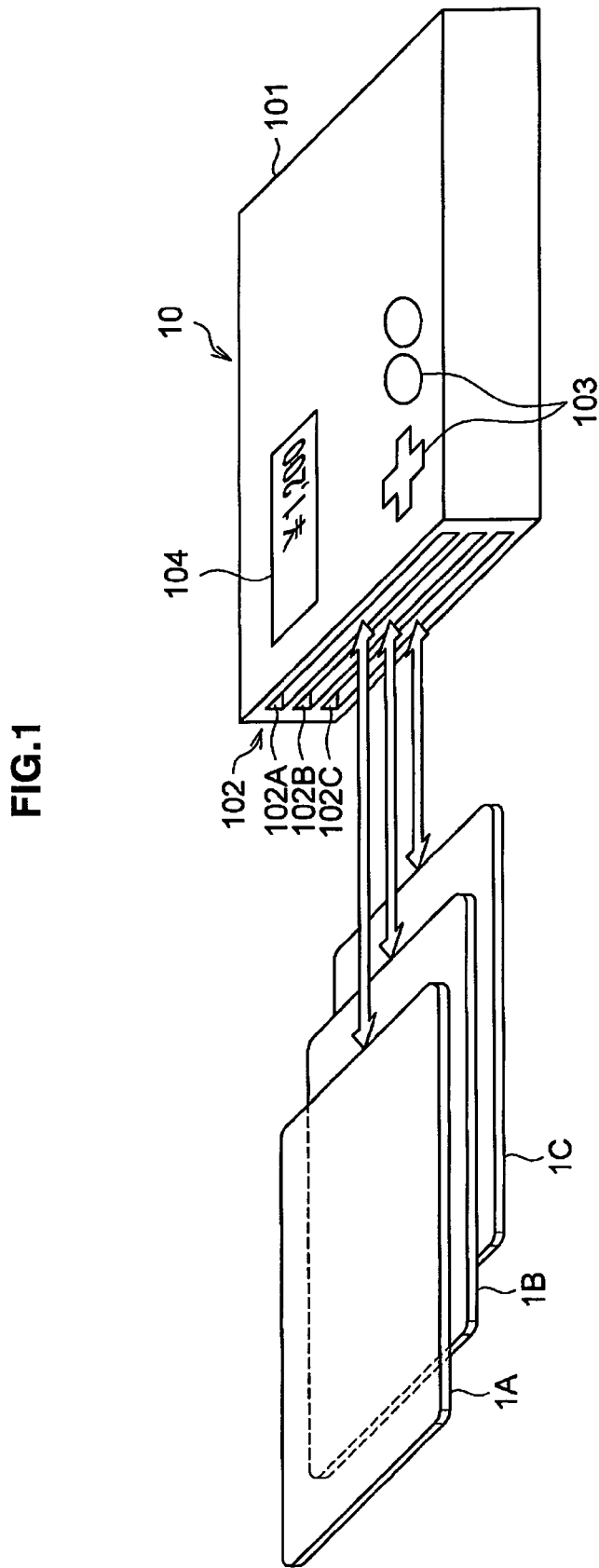
FIG. 1 is a perspective view showing the external structure of the electronic wallet device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The appearance of an electronic wallet device according to a first embodiment of the present invention is described hereinafter with reference to FIG. 1. FIG. 1 is a perspective view showing the external structure of an electronic wallet device 10 of this embodiment.

As shown in FIG. 1, the electronic wallet device 10 of this embodiment is an electronics device with a size that allows a user to carry it in a pocket of clothing, a bag, or the like. The electronic wallet device 10 serves as a holding case which can hold a plurality of non-contact type IC cards 1A, 1B and 1C (which may be hereinafter referred to collectively as the non-contact type IC cards 1). A user can carry the plurality of non-contact type IC cards 1 collectively by holding them in the electronic wallet device 10.

The electronic wallet device 10 includes a casing 101 having a substantially rectangular solid shape, a holding section 102 which detachably holds a plurality of non-contact type IC cards 1, an operating section 103 which serves as a user input interface, and a display section 104 which displays information regarding a service using the non-contact type IC card 1, for example.

The holding section 102 includes a plurality of slots 102A, 102B and 102C which are arranged in parallel with each other on one side surface of the casing 101, for example. The non-contact type IC cards 1A to 1C are inserted to and removed from the slots 102A to 102C, so that the non-contact type IC cards 1 can be detachably attached to the electronic wallet device 10.

Although the electronic wallet device 10 in the example of FIG. 1 includes three slots 102A to 102C so as to hold three non-contact type IC cards 1A to 1C, the present invention is not limited thereto. For example, the number of the non-contact type IC cards 1 which can be held in the electric wallet device 10 may be two or more than three. If all of the non-contact type IC cards 1 to be held have the same shape, the slots 102A to 102C may have the same shape. However, in order to cope with various shapes or sizes of non-contact type IC cards 1, the holding section 102 may have different shapes of slots 102A to 102C.

The non-contact type IC card 1 according to this embodiment is described hereinafter in detail. The non-contact type IC card 1 includes an antenna for performing non-contact communication with a reader/writer (data reading/writing unit) of a host device, and an IC chip which includes an IC that can execute prescribed processing, within a thin card case (cf. FIG. 3). The non-contact type IC card 1 can thereby perform radio communication with a reader/writer of a host device in a non-contact manner. It is thereby possible to read or write data in the non-contact type IC card 1 simply by locating the non-contact type IC card 1 within an effective area of an electromagnetic wave emitted from a reader/writer (or, simply by holding the non-contact type IC card 1 over a reader/writer). Thus, the non-contact type IC card 1 has the advantages that it is easy to use because there is no need to insert/remove the card to/from a reader/writer, it can transmit and receive data quickly, it is not easy to modify or alter to provide high security, and it is reusable by rewriting data, thereby offering convenience to users.

Because of such convenience, the non-contact type IC card 1 is widely applied to IC card systems which provide various kinds of services. For example, the non-contact type IC card 1 is applied to an electronic money system, a transportation ticket gate system, an expressway toll collection system, an electronic settlement system, a security system for entry to a building or a room or login to a personal computer (PC), and so on. The non-contact type IC card 1 may be applied to the following uses (1) to (6), for example:

(1) an electronic money card which stores currency data of electronic money;

(2) a transportation card which stores data of a commuter pass, a reserved seat ticket, a prepaid fare or the like of transportation such as a train, a bus and an expressway;

(3) a personal authentication card which can serve as an identification card such as an employee identification card and a student identification card that is used for identification and attendance management or as a key for entry to and exit from a building;

(4) a membership card, a point card or a coupon card of stores or facilities;

(5) an electronic ticket card which stores electronic ticket data of a theater, a concert hall, a stadium, an amusement facility or the like; and (6) an electronic settlement card which is used for electronic commerce such as internet shopping, video or music contents delivery, and trading of financial products such as a stock and a deposit.

Further, a multi-application type card which has the multiple functions in one non-contact type IC card 1 has been developed, and the non-contact type IC card 1 is becoming increasingly diversified.

This embodiment is intended for the non-contact type IC card 1 which can store electronic value as service data, such as an electronic money card, a transportation ticket card, an electronic ticket card and an electronic settlement card. The electronic value is data which has a currency value or a value that is equivalent to currency, and it includes prepaid electronic money, a prepaid transportation fee, a point or a coupon given upon product purchase at a store or the like, for example.

The electronic wallet device 10 according to this embodiment has a structure that is capable of holding a plurality of various non-contact type IC cards 1. A user can thereby carry a plurality of non-contact type IC cards 1 collectively by holding them in the electronic wallet device 10. Further, at the time of communication with a reader/writer of a host device, the electronic wallet device 10 can automatically select a card that is appropriate for use in the communication with the reader/writer of the host device from the plurality of non-contact type IC cards 1 in accordance with a service provided by the host device. Thus, when using a card, a user simply holds the electronic wallet device 10 which contains the plurality of non-contact type IC cards 1 over a reader/writer 21 of the host device as shown in FIG. 2, and the electronic wallet device 10 automatically selects an appropriate non-contact type card 1 to thereby establish communication with the reader/writer 21. The user can thereby receive a desired service using the non-contact type IC card 1 without taking out the relevant non-contact type IC card 1 from the electronic wallet device 10.

Figure 2A:
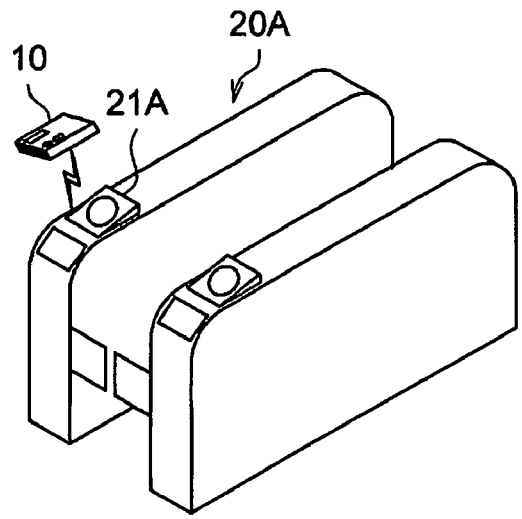
FIGS. 2A to 2C are explanatory views showing the situations of using the electronic wallet device according to the embodiment.

For example, as shown in FIG. 2A, at a transportation ticket gate, a user holds the electronic wallet device 10 which contains a plurality of non-contact type IC cards 1 over a reader/writer 21A of an automatic transportation ticket gate 20A. Then, an appropriate transportation card is selected from the plurality of non-contact type IC cards 1 which are contained in the electronic wallet device 10, and information about payment of a transportation fee is exchanged between the selected transportation card and the reader/writer 21A.

Figure 2B:
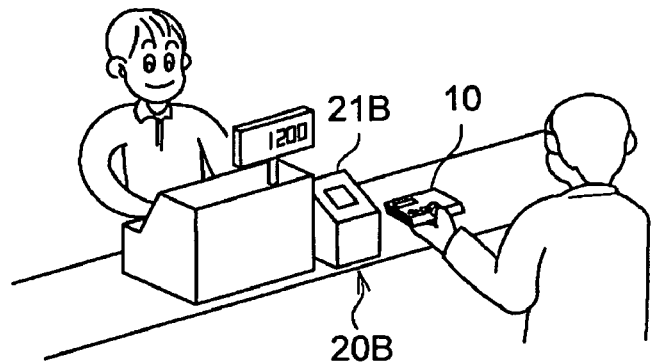

For another example, as shown in FIG. 2B, at a store such as a convenience store or a department store, a user holds the electronic wallet device 10 over a reader/writer 21B of a cash register device 20B. Then, an appropriate electronic money card is selected from the plurality of non-contact type IC cards 1 which are contained in the electronic wallet device 10, and information about payment of a product fee is exchanged between the selected electronic money card and the reader/writer 21B.

Figure 2C:
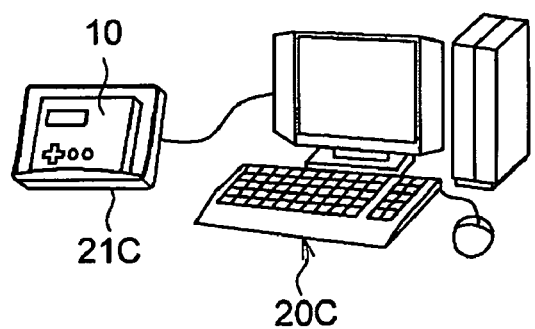

For yet another example, as shown in FIG. 2C, in electronic commerce using a user terminal 20C (e.g. a personal computer) which is connected to the internet or the like, a user holds the electronic wallet device 10 over a reader/writer 21C of the user terminal 20C. Then, an appropriate electronic settlement card is selected from the plurality of non-contact type IC cards 1 which are contained in the electronic wallet device 10, and information about electronic commerce is exchanged between the selected electronic settlement card and the reader/writer 21C.

As described above, if the electronic wallet device 10 according to this embodiment is located within a communication area of the reader/writer 21 of the host device 20, the non-contact type IC card 1 which corresponds to the service that is provided by the host device 20 is automatically selected, and information concerning a desired service is exchanged between the selected non-contact type IC card 1 and the host device 10. In FIG. 2, host devices such as the automatic transportation ticket gate 20A, the cash register device 20B and the user terminal 20C are illustrated as external units to be communicated with the electronic wallet device 10. Besides those devices, other arbitrary external units which are capable of non-contact communication with the non-contact type IC card 1, such as an automatic vending machine of products or tickets, a points of sale (POS) terminal, a kiosk terminal, and an automatic teller machine (ATM) of a financial institution, may be used.

The configuration of an IC card system which uses the above-described electronic wallet device 10 is described hereinafter in detail.

Referring first to FIG. 3, an example of the configuration of the IC card system according to the embodiment of the present invention is described. FIG. 3 is a block diagram showing an example of the configuration of a host device 20 and a non-contact type IC card 1 in the IC card system according to the embodiment.

As shown in FIG. 3, in the IC card system, the reader/writer 21 of the host device 20 transmits power to the non-contact type IC card 1 by generating a radio frequency (RF) operating magnetic field and further modulates the RF operating magnetic field according to a command or data. Non-contact communication is thereby performed between the reader/writer 21 and the non-contact type IC card 1. The communication may be "symmetric transmission" that does not use a subcarrier, which is performed at a transmission speed of 212 kbps with the use of a 13.56 MHz frequency band, for example. An amplitude shift keying (ASK) modulation may be used as a modulating method, and Manchester encoding may be used as an encoding method. Although a time slot method may be used as a method of detecting and avoiding data collision (anti-collision), for example, the IC card system does not necessarily support the anti-collision function. The IC card system repeats transaction in such a way that the reader/writer 21 of the host device 20 issues various kinds of commands to the non-contact type IC card 1, and the non-contact type IC card 1 responds to those commands, thereby performing communication regarding a prescribed service.

The configuration of the host device 20 is described below. The host device 20 includes a control section 22, a communication section 23, an antenna 24, a storing section 25, an operating section 26, an external interface 27 and so on. The control section 22, the communication section 23, the antenna 24 and so on constitute the reader/writer 21.

The control section 22 is configured of a micro-processor or the like, and it controls each section of the host device 20 and performs prescribed processing. The control section 22 operates according to a program which is stored in the storing section 25, and executes possessing concerning a prescribed service, generation of commands and control of transmission and reception of information, for example. The reader/writer 21 can thereby perform card detection (polling), mutual authentication, data reading and writing and so on for the non-contact type IC card 1.

The communication section 23 performs non-contact communication with the non-contact type IC card 1 using the antenna 24 according to a direction from the control section 22. Specifically, the communication section 23 generates an RF operating magnetic field using the antenna 24 and transmits power to the non-contact type IC card 1 through the RF operating magnetic field, and further modulates the RF operating magnetic field according to a command or data concerning a prescribed service and transmits the command or data to the non-contact type IC card 1. Further, the communication section 23 demodulates the RF operating magnetic field which is transmitted from the non-contact type IC card 1, obtains a command or data that is sent from the non-contact type IC card 1, and outputs them to the control section 22.

The antenna 24 is an antenna to communicate with the non-contact type IC card 1, and it is configured of a coil antenna, for example. The antenna 24 is connected with the communication section 23.

The storing section 25 is configured of a storage device such as a read only memory (ROM), a random access memory (RAM) or a hard disk drive, and it and stores information permanently or temporarily. The storing section 25 stores various kinds of data such as a program for causing the control section 22 to operate so as to provide a prescribed service by non-contact communication, a code (a service code, a system code etc.) that represents a service to which the reader/writer 21 corresponds, data that is acquired from the non-contact type IC card 1, data that is processed by the control section 22, and data that is input from the operating section 26 or the external interface 27, for example.

The operating section 26 is configured of an input device such as operation key, for example, and a user can operate the host device 20 using the operating section 26. If the host device 20 includes a display device such as a display, though not shown, a user can check the information which is displayed on the display device. The external interface 27 is a device for exchanging information with an external device (not shown) which is connected to the host device 20 through a network.

The configuration of the non-contact type IC card 1 is described hereinbelow. The non-contact type IC card 1 includes a control section 12, a communication section 13, an antenna 14, a storing section 15 and so on. The control section 12, the communication section 13 and the storing section 15 are mounted on a small IC chip. The antenna 14 is configured of a coil antenna which is located along the periphery of the non-contact type IC card 1 or the like, and it is connected with the communication section 13.

The control section 12 is configured of a micro-processor or the like, and it controls each section of the non-contact type IC card 1 and performs prescribed processing. The control section 12 operates according to a program such as an application program which is stored in the storing section 15, and executes prescribed processing, generation of commands, control of transmission and reception of information and so on. For example, when the control section 12 communicates with the reader/writer 21 concerning a prescribed service, the control section 12 can read or write data concerning the service (service data) from or to the storing section 15.

The communication section 13 performs non-contact communication with the reader/writer 21 of the host device 20 using the antenna 14 according to a direction from the control section 12. Specifically, the communication section 13 is configured of a front-end circuit, a power reproduction circuit or the like, which is not shown, and it supplies power and data obtained from the reader/writer 21 to the control section 12. The power reproduction circuit generates an induced electromotive force from the RF operating magnetic field of a carrier wave which is generated by the reader/writer 21 and takes it in as power of the non-contact type IC card 1, using the antenna 14. The induced electromotive force is used as a power source to drive each element of the non-contact type IC card 1. The front-end circuit receives the carrier wave which is emitted from the reader/writer 21 using the antenna 14, acquires a command or data from the reader/writer 21 by demodulating the carrier wave, and supplies the command or data to the control section 12. Further, the communication section 13 reproduces a clock for driving the non-contact type IC card 1 by dividing the frequency of the carrier wave. Furthermore, the communication section 13 modulates the carrier wave according to the command or data concerning a prescribed service which is generated by the control section 12 and transmits the modulated carrier wave to the reader/writer 21 using the antenna 14.

The storing section 15 is configured of a memory such as ROM or RAM and stores various kinds of information. For example, the storing section 15 may be configured of a nonvolatile memory such as an electrically erasable and programmable ROM (EEPROM), a flash memory or a ferroelectric RAM (FeRAM). The storing section 15 stores various kinds of data such as an application program to cause the control section 12 to operate so as to provide a prescribed service by non-contact communication, a card ID to uniquely identify the non-contact type IC card 1, a code (a service code, a system code etc.) that represents a service to which the non-contact type IC card 1 corresponds, and service data (electronic value etc.), for example.

If the non-contact type IC card 1 is a multi-application card which corresponds to a plurality of services, the storing section 15 stores a plurality of kinds of codes, application programs, service data and so on which correspond to the respective services.

In such a configuration, the reader/writer 21 of the host device 20 and the non-contact type IC card 1 perform non-contact communication, thereby providing services using the non-contact type IC card 1 to a user. Although the non-contact type IC card 1 is capable of performing non-contact communication directly with the reader/writer 21 as shown in FIG. 3, it can communicate with the reader/writer 21 indirectly through the electronic wallet device 10 in the state that the non-contact type IC card 1 is contained in the electronic wallet device 10. In other words, the electronic wallet device 10 has a function to mediate non-contact communication between a plurality of non-contact type IC cards 1 and the reader/writer 21. The electronic wallet device 10 and the non-contact type IC card 1 which is contained inside the electronic wallet device 10 can perform non-contact communication on the same principle as the case of the reader/writer 21 and the non-contact type IC card 1 shown in FIG. 3 (cf. FIG. 4).

Referring then to FIG. 4, the configuration of the electronic wallet device 10 according to the embodiment of the present invention is described hereinafter. FIG. 4 is a block diagram showing the schematic configuration of the electronic wallet device 10 according to this embodiment.

As shown in FIG. 4, the electronic wallet device 10 mainly includes a casing 101, a holding section 102, an operating section 103, a display section 104, card communication antennas 105A to 105C, a shield 106, an external communication antenna 107, a value storing section 108, a storing section 109, and a control section 110.

The casing 101 of the electronic wallet device 10 includes the holding section 102 to hold a plurality of non-contact type IC cards 1. The holding section 102 is composed of the above-described plurality of slots 102A to 102C (cf. FIG. 1), for example, and stably holds the plurality of (e.g. three in the example FIG. 4) non-contact type IC cards 1A to 1C which are inserted through card insertion openings of the casing 101. The holding section 102 is sectionalized into holding areas (i.e. the slots 102A to 102C) which correspond to each non-contact type IC card 1, and the holding areas respectively include the card communication antennas 105A to 105C (which are also referred to collectively as the card communication antennas 105).

The card communication antenna 105 is an antenna for performing non-contact communication with each non-contact type IC card 1 which is held in the holding section 102. The card communication antenna 105 is configured of a coil antenna, for example, and it is connected to the control section 110. A plurality of card communication antennas 105 are placed corresponding one-to-one to each non-contact type IC card 1 which is held in the holding section 102, and they are positioned opposite to each non-contact type IC card 1. Thus, each card communication antenna 105 can individually perform non-contact communication with each non-contact type IC card 1 which is held in the holding section 102. Further, the card communication antennas 105 are connected to the external communication antenna 107 via the control section 110, so that they can exchange data to be read from or written to the storing section 15 in the non-contact type IC card 1 with the reader/writer 21.

Further, the holding section 102 has the shield 106 so as to separate the plurality of non-contact type IC cards 1 which are held therein from each other. The shield 106 is made of a material which shields an electromagnetic wave and has a shape that individually surrounds each non-contact type IC card 1 held in the holding section 102. The shield 106 electromagnetically isolates the plurality of non-contact type IC cards 1 in the holding section 102 from each other, thereby avoiding mutual interference. It is thereby possible to prevent the antenna coils of the adjacent non-contact type IC cards 1 from magnetically coupling with each other so as to eliminate an influence caused by electromagnetic induction of another non-contact type IC card 1 or the like. Therefore, one non-contact type IC card 1 which is selected from a plurality of non-contact type IC cards 1 in the holding section 102 can suitably communicate with the reader/writer 21 without being interfered by the other non-contact type IC cards 1.

As described above, the holding section 102 includes a plurality of card communication antennas 105 which respectively correspond to a plurality of non-contact type IC cards 1 and the shield 106 which electromagnetically isolates the plurality of non-contact type IC cards 1 from each other. Therefore, even when a plurality of non-contact type IC cards 1 which do not support the anti-collision function (the function of detecting and avoiding data collision) are held in the holding section 102, each non-contact type IC card 1 can perform communication individually. However, the present invention is not limited to such an example, and in the case of holding only the non-contact type IC cards 1 which support the anti-collision function, the shield 106 may be eliminated, and the holding section 102 may include a single card communication antenna 105 which is commonly used for all the non-contact type IC cards 1.

The operating section 103 is configured of an operating key such as a button, a lever and a touch panel, for example. A user can direct the operation of the electronic wallet device 10 or input data by operating the operating section 103. For example, by operating the operating section 103, a user can direct the transfer of electronic value between the value storing section 108 and the non-contact type IC card 1 or indicate a transfer source/destination of the non-contact type IC card 1 or a transfer amount.

The display section 104 is configured of a display device such as a liquid crystal display device. The display section 104 displays various kinds of information concerning services using the non-contact type IC cards 1. For example, the display section 104 can display a type of the non-contact type IC card 1 which is held in the holding section 102, card inside information such as service data that is stored in the cards 1 (e.g. a balance of electronic value), and so on.

The external communication antenna 107 is an antenna by which the electronic wallet device 10 performs non-contact communication with an external unit such as the reader/writer 21 of the host device 20, and it is configured of a coil antenna, for example. The external communication antenna 107 is connected to the control section 110. The external communication antenna 107 receives a carrier wave which is transmitted from the reader/writer 21 and outputs a signal corresponding to the carrier wave to the control section 110. Further, the external communication antenna 107 transmits a carrier wave corresponding to a signal which is output from the control section 110 to the reader/writer 21.

The value storing section 108 is configured of a nonvolatile memory such as EEPROM, a flash memory or FeRAM, for example. The value storing section 108 stores electronic value which can be commonly used for each service. For example, the value storing section 108 stores electronic value which is charged from the reader/writer 21 of the host device 20 to the electronic wallet device 10, electronic value which is transferred from the non-contact type IC card 1 and so on.

Common electronic value which is stored in the value storing section 108 is described hereinbelow. Electronic value which is used for an existing electronic money service is available for only the non-contact type IC card 1 which corresponds to a relevant electronic money service, and there is no compatibility of electronic value among different services. For example, electronic value which is used for a non-contact type IC card 1A that corresponds to an electronic money service A has not been available for another non-contact type IC card 1B that corresponds to another electronic money service B. Therefore, it has not been unable to exchange or combine electronic value of electronic money among a plurality of non-contact type IC cards 1 which correspond to different electronic money services (which are hereinafter referred to as different kinds of non-contact type IC cards 1). Accordingly, it is necessary for a user who owns a plurality of non-contact type IC cards 1 to use different non-contact type IC cards for different services, which is inconvenient.

On the other hand, electronic value which is stored in the value storing section 108 according to this embodiment can be commonly used for a plurality of services (e.g. a plurality of electronic money services). Such common electronic value can be transferred and combined not only between a plurality of non-contact type IC cards 1 which correspond to the same kind of services, but also between a plurality of non-contact type IC cards 1 which correspond to different kinds of services. Thus, the value storing section 108 functions as a cache for various kinds of electronic value which are stored in a plurality of non-contact type IC cards 1. Because the electronic wallet device 10 includes the value storing section 108 having such a function, it can flexibly cope with a plurality of non-contact type IC cards 1 which correspond to the same kind or different kinds of services.

The storing section 109 is configured of a semiconductor memory such as ROM or RAM, for example, and stores various kinds of information. For example, the storing section 109 stores various kinds of program for causing the control section 110 to operate and various kinds of data such as data which is acquired from the reader/writer 21 during communication between the reader/writer 21 and the non-contact type IC card 1 and data which is processed by the control section 110.

Further, the storing section 109 stores a card information database 120 which contains information that is stored in a plurality of non-contact type IC cards 1 which are held in the holding section 102 (which is hereinafter referred to as the card inside information). The card inside information may be information which represents a card ID that is stored in the storing section 15 of each non-contact type IC card 1, a code of a service to which the non-contact type IC card 1 correspond (e.g. a service code, a system code etc.), service data that includes electronic value and so on. The control section 110 can select the non-contact type IC card 1 to be used for communication with the reader/writer 21 based on the card inside information in the card information database 120.

The control section 110 is configured of a micro processor which is mounted on an IC chip, for example. The control section 110 controls each section of the electronic wallet device 10 and performs prescribed processing. The control section 110 operates according to a program which is stored in the storing section 109 and executes processing concerning a prescribed service, generation of commands, control of transmission and reception of various kinds of information and so on. The electronic wallet device 10 can thereby perform transaction processing for the non-contact type IC card 1 such as card detection (polling), mutual authentication and data reading and writing with the reader/writer 21.

Further, the control section 110 serves as a communication section 111, a card information registration section 112, a card selection section 113, a transaction capability determination section 114, a value transfer section 115, and a transaction processing section 116. Those functional sections are described hereinbelow.

The communication section 111 communicates data with the reader/writer 21 of the host device 20 via the external communication antenna 107 and also communicates data with each non-contact type IC card 1 via the card communication antenna 105. The communication section 111 allows various kinds of commands and data to be exchanged between the host device 20 and the electronic wallet device 10 and between the electronic wallet device 10 and the non-contact type IC card 1.

The communication section 111 receives a transaction request for a service which is provided by the host device 20 from the reader/writer 21 of the host device 20. The transaction request is, for example, a request for payment of a prescribed amount of electronic value in an electronic money service or an electronic settlement service, a request for payment of a prescribed amount of transportation fee in a transportation service, a request for addition, deletion, or update of a point or a coupon in a point/coupon card system.

Further, the communication section 111 can communicably connect the non-contact type IC card 1 which is selected by the card selecting section 113, which is described later, and the reader/writer 21 of the host device 20 via the card communication antenna 105 and the external communication antenna 107. Therefore, when the electronic wallet device 10 is held over the reader/writer 21, the non-contact type IC card 1 in the electronic wallet device 10 can exchange commands or data concerning a prescribed service with the reader/writer 21, just like when the non-contact type IC card 1 by itself is held over the reader/writer 21.

The card information registration section 112 recognizes the non-contact type IC card 1 which is held in the holding section 102 and registers the card inside information which is stored in the non-contact type IC card 1 onto the card information database 120. Specifically, the card information registration section 112 recognizes whether the non-contact type IC card 1 is held in each slot 102A to 102C by detecting the insertion of the non-contact type IC cards 1A to 1C into the respective slots 102A to 102C or the removal of the non-contact type IC cards 1A to 1C from the respective slots 102A to 102C. Further, the card information registration section 112 determines the kind of the non-contact type IC card 1 which is held in each of the slots 102A to 102C by reading out identification information such as a code (e.g. a service code, a system code etc.) or a card ID from the non-contact type IC card 1 which is held in the slots 102A to 102C. The code is information which represents the kind of a service to which the non-contact type IC card 1 corresponds, which is, the kind of the non-contact type IC card 1. The card information registration section 112 can determine whether a plurality of non-contact type IC cards 1 are the same kind of cards or different kinds of cards based on the code which is stored in each non-contact type IC card 1.

Further, the card information registration section 112 registers or updates the card inside information which is stored in the non-contact type IC card 1 that is held in the holding section 102 onto the card information database 120 of the storing section 109. The card information registration section 112 may execute the registration/update operation triggered by the insertion/removal of the non-contact type IC cards 1 to/from the holding section 102, or may execute the registration/update operation regularly after holding each card. Specifically, when the non-contact type IC card 1 is inserted into the holding section 102, for example, the card information registration section 112 reads out the card inside information which is stored in the storing section 15 of the non-contact type IC card 1 that is held in the holding section 102 and registers the card inside information onto the card information database 120. Further, when the non-contact type IC card 1 is removed from the holding section 102, for example, the card information registration section 112 deletes the card inside information of the non-contact type IC card 1 from the card information database 120. Furthermore, when the non-contact type IC card 1 is used and the service data in this card is changed, for example, the card information registration section 112 updates the information which represents the service data of the relevant non-contact type IC card 1 in the card information database 120.

The card selecting section 113 selects the card to be used for communication with the reader/writer 21 from a plurality of non-contact type IC cards 1 which are held in the holding section 102 according to a communication request from the reader/writer 21 of the host device 20. In the IC card system, the service which is implemented by non-contact communication between the reader/writer 21 and the non-contact type IC card 1 can be specified by a code that is included in the communication request from the host device 20 (e.g. a system code or a service code representing a service provided by the host device 20). At an early stage of non-contact communication, the reader/writer 21 transmits a communication request (request command) which includes the pertinent code and detects whether the non-contact type IC card 1 which corresponds to the service exists within a communication area of the reader/writer 21 (which is called polling). The card selecting section 113 selects the non-contact type IC card 1 which is appropriate for the code that is included in the communication request from the reader/writer 21 based on the code of each non-contact type IC card 1 which is registered in the card information database 120, for example.

Specifically, at the start of communication between the host device 20 and the electronic wallet device 10, the communication section 111 of the electronic wallet device 10 receives a communication request which includes a code representing a prescribed service to which the host device 20 corresponds from the reader/writer 21 of the host device 20 via the external communication antenna 107. Then, the card selecting section 113 reads out the code of the service to which the non-contact type IC card held in the holding section 102 corresponds from the card information database 120 of the storing section 109 and checks the received code against the read-out code to thereby specify the non-contact type IC card 1 which corresponds to the service for which the communication request is made by the reader/writer 21. Accordingly, the card selecting section 113 can select the non-contact type IC card 1 which can be used for the service for which the communication request is made from a plurality of non-contact type IC cards 1 that are held in the holding section 102.

The transaction capability determination section 114 determines whether the requested transaction can be executed with use of the electronic value which is stored in the electronic wallet device 10 and/or each non-contact type IC card 1 according to the transaction request that is transmitted from the reader/writer 21 and received by the communication section 111. The transaction request may be a request for payment of electronic money, electronic settlement, transportation fee or the like, or a request for addition, deletion or update of a point or a coupon, for example.

As an example of the transaction request, the case where a request for payment of electronic money is made is described in detail hereinbelow. According to the payment request of a prescribed amount of electronic value which is received from the reader/writer 21 of the host device 20, the transaction capability determination section 114 determines whether the payment can be made with the electronic value which is stored in the electronic wallet device 10 and/or each non-contact type IC card 1. The transaction capability determination section 114 can determine whether the payment can be made with the electronic value which is held in the electronic wallet device 10 as a whole (total value determination). Further, the transaction capability determination section 114 can determine whether the payment can be made with the electronic value which is held in each individual non-contact type IC card 1 (individual value determination).

In the case of performing the total value determination, the transaction capability determination section 114 calculates the total amount of electronic value stored in the value storing section 108 of the electronic wallet device 10 and the electronic value stored in one or more non-contact type IC cards 1 in the holding section 102 (which is hereinafter referred to as the total value) based on the card information database 120. Then, if the calculated total value is equal to or larger than the prescribed amount requested by the reader/writer 21, the transaction capability determination section 114 determines that the payment can be made, and if the calculated total value is smaller than the prescribed amount, it determines that the payment cannot be made.

The total value may contain the total amount of electronic value stored in all of the non-contact type IC cards 1 in the holding section 102, regardless of the kinds of services to which the cards 1 correspond (total value for all services). Alternatively, the total value may contain the total amount of electronic value stored in one or more non-contact type IC cards 1 which correspond to the service provided by the host device 20 from which the payment request is transmitted, out of a plurality of non-contact type IC cards 1 in the holding section 102 (total value for individual service).

For example, assume the case where two non-contact type IC cards 1A and 1B which correspond to a prescribed electronic money service A and a non-contact type IC card 1C which corresponds to another electronic money service B are held in the electronic wallet device 10, the cards 1A, 1B and 1C have the electronic value of 100, 200 and 500 points, respectively, and the electronic value stored in the value storing section 108 is 0 point. In such a case, the total value for all services is 800 points, and the total values for the individual electronic money service A and B are 300 points and 500 points, respectively. The total value for all services is the determination criterion on condition that electronic value can be transferred between the non-contact type IC cards 1 for the same and different kinds of services. On the other hand, the total value for individual service is the determination criterion on condition that electronic value can be transferred only between the non-contact type IC cards 1 for the same kind of service.

In the case of performing the individual value determination, the transaction capability determination section 114 reads out the electronic value stored in any one of the non-contact type IC cards 1 in the holding section 102 (which is hereinafter referred to as the individual value) from the card information database 120 and, if the amount of the individual value is equal to or larger than the prescribed amount which is requested from the host device 20, it determines that the payment can be made, and if the amount of the individual value is smaller than the prescribed amount, it determines that the payment cannot be made. It is thereby possible to determine whether the payment of the prescribed amount requested from the host device 20 can be made with the single non-contact type IC card 1 that corresponds to the service provided by the host device 20 from which the payment request is transmitted. The individual value determination may be performed for the non-contact type IC card 1 which is selected as a card to be used for communication with the reader/writer 21 of the host device 20 by the card selection section 113. If, as a result, it is determined that the payment with the electronic value stored in the non-contact type IC card 1 can be made, the prescribed amount of electronic value is paid with use of the electronic value of the non-contact type IC card 1 only. On the other hand, if it is determined that the payment cannot be made, the prescribed amount of electronic value is paid to the host device 20 after transferring electronic value to the non-contact type IC card 1 from the value storing section 108 or another non-contact type IC card 1 and increasing the balance of the electronic value in the non-contact type IC card 1 to be equal to or larger than the prescribed amount.

The value transfer section 115 transfers electronic value between the value storing section 108 of the electronic wallet device 10 and the non-contact type IC card 1 held in the holding section 102. Specifically, the value transfer section 115 can transfer the electronic value which is stored in the non-contact type IC card 1 to the value storing section 108, and reversely, transfer the electronic value which is stored in the value storing section 108 to the non-contact type IC card 1. The transfer of electronic value means to reduce at least part of the amount of electronic value stored in one storing medium and increase the amount of electronic value stored in another storing medium by the reduced amount of electronic value.

If the transaction capability determination section 114 determines that the payment of the prescribed amount requested from the reader/writer 21 cannot be made with the single non-contact type IC card 1 selected by the card selection section 113, the value transfer section 115 transfers the electronic value that is equal to or hither than the insufficient amount to the selected non-contact type IC card 1 from the value storing section 108 or another non-contact type IC card 1. This enables the payment of the prescribed amount of electronic value by the selected non-contact type IC card 1.

Further, the value transfer section 115 may transfer electronic value between the non-contact type IC card 1 and the value storing section 108 based on a user input to the display section 103. A user can thereby transfer electronic value from a desired non-contact type IC card 1 to the electronic wallet device 10 or transfer electronic value from the electronic wallet device 10 to a desired non-contact type IC card 1. The amount of electronic value which is transferred manually may be determined by a user designating an arbitrary amount or by the value transfer section 115 automatically selecting a predetermined amount (e.g. 1000 points).

Furthermore, the value transfer section 115 can add up the electronic value stored in a plurality of non-contact type IC card 1 by transferring them to the value storing section 108 and charge a single non-contact type IC card 1 with the total value in the value storing section 108 collectively. The value transfer section 115 can also divide the electronic value stored in the value storing section 108 and charge a plurality of non-contact type IC cards 1 with the value.

In this regard, electronic value may be transferred only between the same kind of the non-contact type IC cards 1 via the value storing section 108 by differentiating electronic value for each service. It is thereby possible to manage and use electronic value separately for each service so as to maintain the differentiation of electronic value between different services. Alternatively, electronic value may be transferred between the different kinds of the non-contact type IC cards 1 via the value storing section 108 by using the advantage that the value storing section 108 is capable of holding the common electronic value. It is thereby possible to manage the electronic value used for a plurality of services collectively, which allows flexible use of the electronic value by transferring the electronic value between the different kinds of the non-contact type IC cards 1. This increases the convenience of a user who possesses a plurality of non-contact type IC cards 1.

The transaction processing section 116 makes control so as to execute transaction between the host device 20 and the non-contact type IC card 1 according to the above-described transaction request. For example, when the transaction processing section 116 receives the request for payment of the prescribed amount of electronic value from the host device 20, the transaction processing section 116 makes control so that the prescribed amount of electronic value is paid to the host device 20 from the non-contact type IC card 1 which is selected by the card selection section 113. Specifically, in the state where the host device 20 and the selected non-contact type IC card 1 are communicably connected with each other, the transaction processing section 116 outputs the payment request which is transmitted from the reader/writer 21 to the non-contact type IC card 1 to direct the payment, and then relays the transmission/reception of commands or data between the non-contact type IC card 1 and the reader/writer 21.

Further, the transaction processing section 116 can charge the value storing section 108 with the electronic value which is acquired from the host device 20 by transmitting/receiving commands or data concerning the charge of the electronic value to/from the reader/writer 21 of the host device 20.

The configuration of the electronic wallet device 10 according to the present embodiment is described in the foregoing with reference to FIG. 4. The functional sections 111 to 116 of the control section 110 shown in FIG. 4 may be implemented by installing program for executing each function on the electronic wallet device 10 or by mounting dedicated hardware.

The advantages of the electronic wallet device 10 having the above-described configuration are described hereinafter. In an existing typical common IC card system, data transmission and reception are performed directly between the host device 20 including the reader/writer 21 and the non-contact type IC card 1, and electronic value is directly read from or written to the storing section 15 of the non-contact type IC card 1 according to a content of transaction as shown in FIG. 3.

On the other hand, the electronic wallet device 10 according to this embodiment includes the value storing section 108 which is capable of storing electronic value for various kinds of services. The electronic wallet device 10 can thereby transfer electronic value between the non-contact type IC card 1 and the value storing section 108 and transfer electronic value between a plurality of non-contact type IC cards 1 via the value storing section 108. Accordingly, in the electronic wallet device 10, the value storing section 108 serves as a cache which temporarily stores electronic value before using the electronic value by the non-contact type IC card 1, so that electronic value for various kinds of services can be put in or taken out of the value storing section 108. It is thereby possible to manage electronic value for the same kind or different kinds of electronic money services collectively using the value storing section 108, which allows flexible coping with the use of various kinds of electronic value stored in a plurality of non-contact type IC cards 1.

Figure 5:
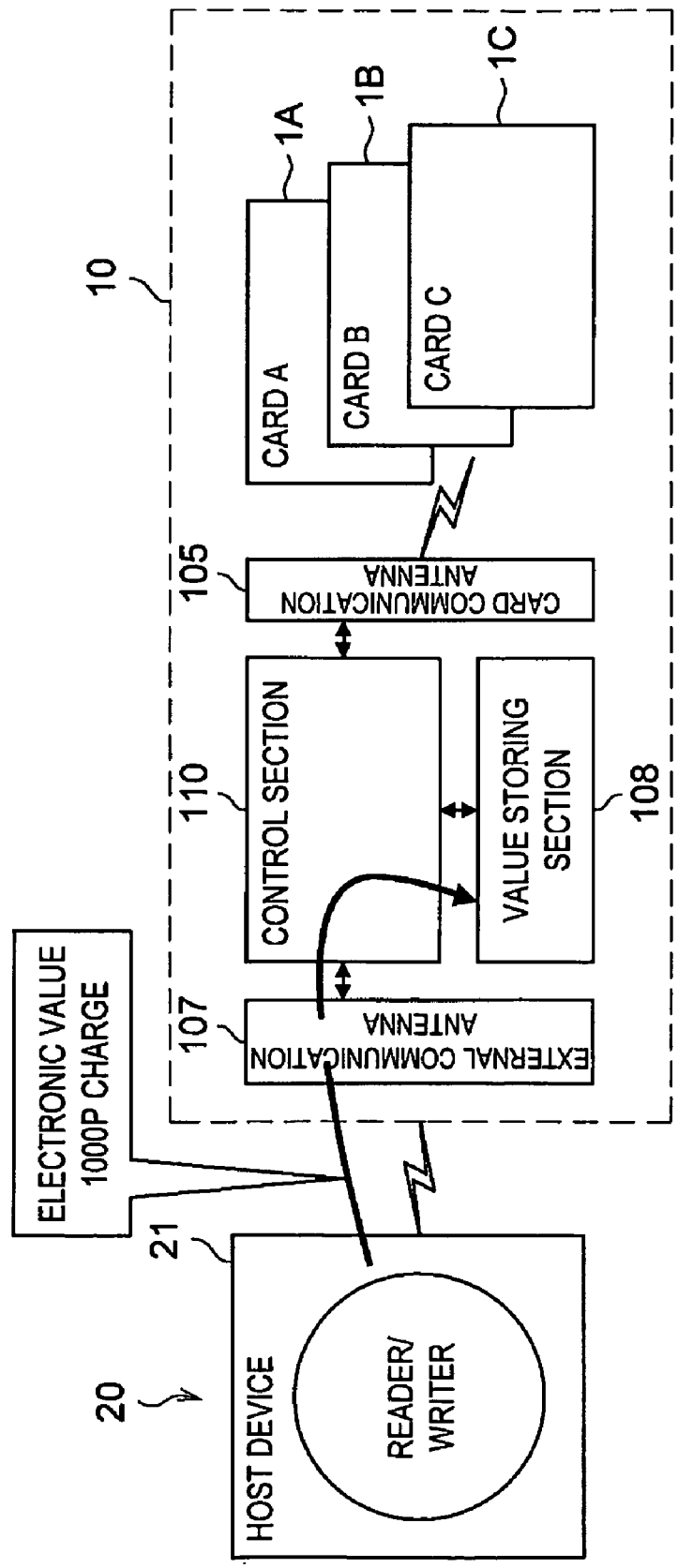
FIG. 5 is an explanatory view showing the scheme of charge of electronic value in the electronic wallet device according to the embodiment.
Figure 6:
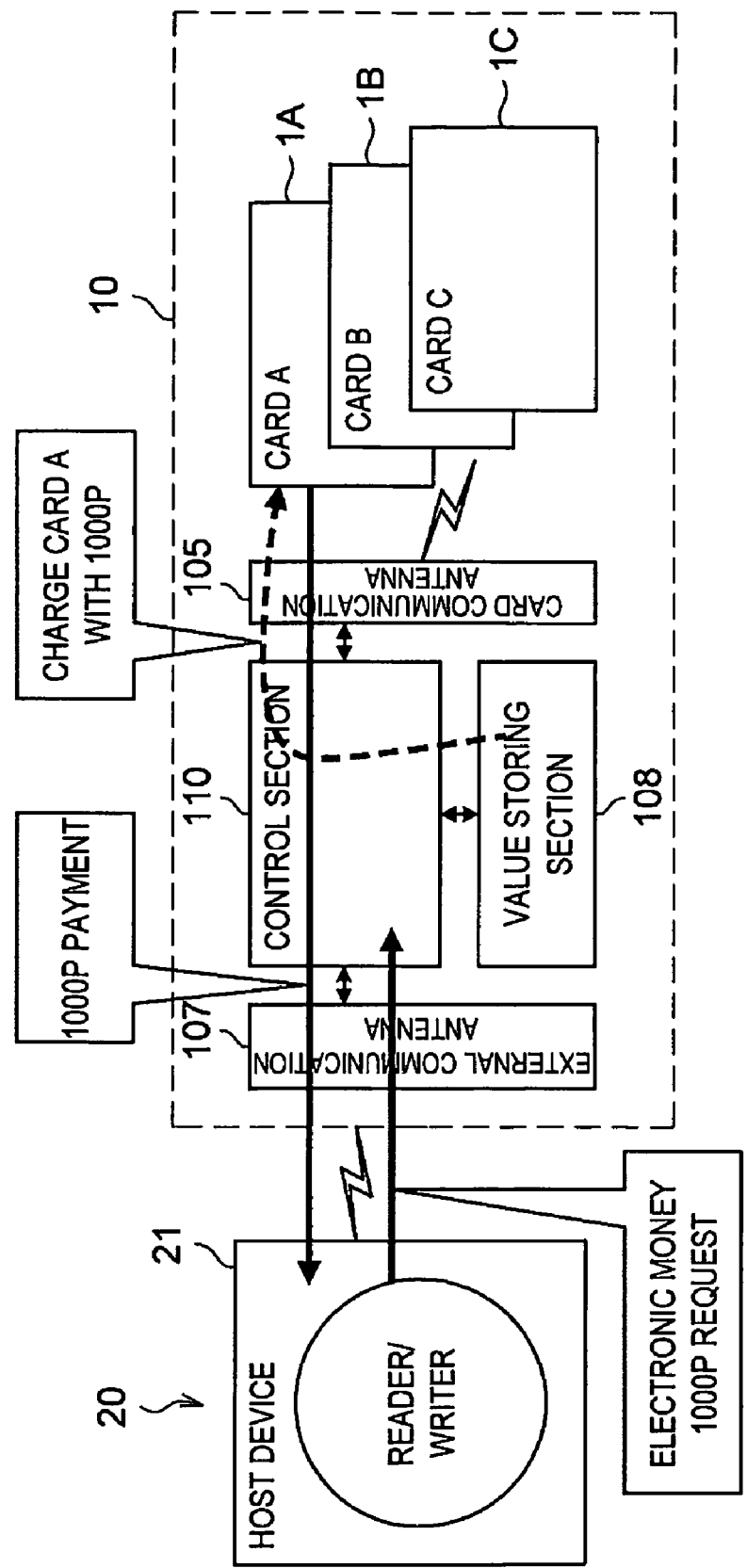
FIG. 6 is an explanatory view showing the scheme of use of electronic value in the electronic wallet device according to the embodiment.

Referring then to FIGS. 5 to 6, the outline of a method of using electronic value with use of the above-described electronic wallet device 10 is described hereinbelow. FIG. 5 is an explanatory view showing the scheme of charge of electronic value in the electronic wallet device 10 according to the embodiment. FIG. 6 is an explanatory view showing the scheme of use of electronic value in the electronic wallet device 10 according to the embodiment. In FIGS. 5 to 6, the configuration of the electronic wallet device 10 shown in FIG. 4 is illustrated in a simplified form.

As shown in FIG. 5, when charging the electronic wallet device 10 with electronic value from the reader/writer 21 of the host device 20, the electronic value to be charged (e.g. 1000 points) is stored into the value storing section 108. In this manner, a user can have the value storing section 108 of the electronic wallet device 10 function as a bank account, for example, and charge (deposit) it with the own electronic value.

Then, as shown in FIG. 6, when using an electronic money, the electronic value which is stored in the value storing section 108 is transferred (charged) to the non-contact type IC card 1A that corresponds to the kind of the electronic money service A to be used, and used by the electronic money service A. Specifically, when the control section 110 of the electronic wallet device 10 receives a prescribed amount of payment request (e.g. 1000 points) from the reader/writer 21 of the host device 20, it transfers (charges) the electronic value which is stored in the value storing section 108 to the non-contact type IC card 1A that corresponds to the kind of the electronic money service A to be used. Then, the non-contact type IC card 1A which has received the transferred electronic value communicates with the reader/writer 21 and makes payment of the requested prescribed amount of electronic value (e.g. 1000 points) out of the electronic value which is stored in the card 1A to the host device 20. If the electronic value which is stored in the value storing section 108 is transferred (charged) to the non-contact type IC card 1A, the transferred electronic value functions as electronic value which can be used for the electronic money service A to which the non-contact type IC card 1A corresponds.

As described in the forgoing, the electronic wallet device 10 according to the embodiment allows the electronic value stored in the value storing section 108 to be used as common electronic value for various kinds of electronic money services. Further, when using the electronic value, the electronic wallet device 10 transfers the electronic value stored in the value storing section 108 to the non-contact type IC card 1A and then uses the transferred electronic value from the non-contact type IC card 1A to the host device 20, rather than using the electronic value directly from the value storing section 108 to the host device 20. The electronic value which is stored in the value storing section 108 is used via the non-contact type IC card 1 because the electronic value stored in the value storing section 108 is the common electronic value which does not belong to any electronic money service.

Figure 7:
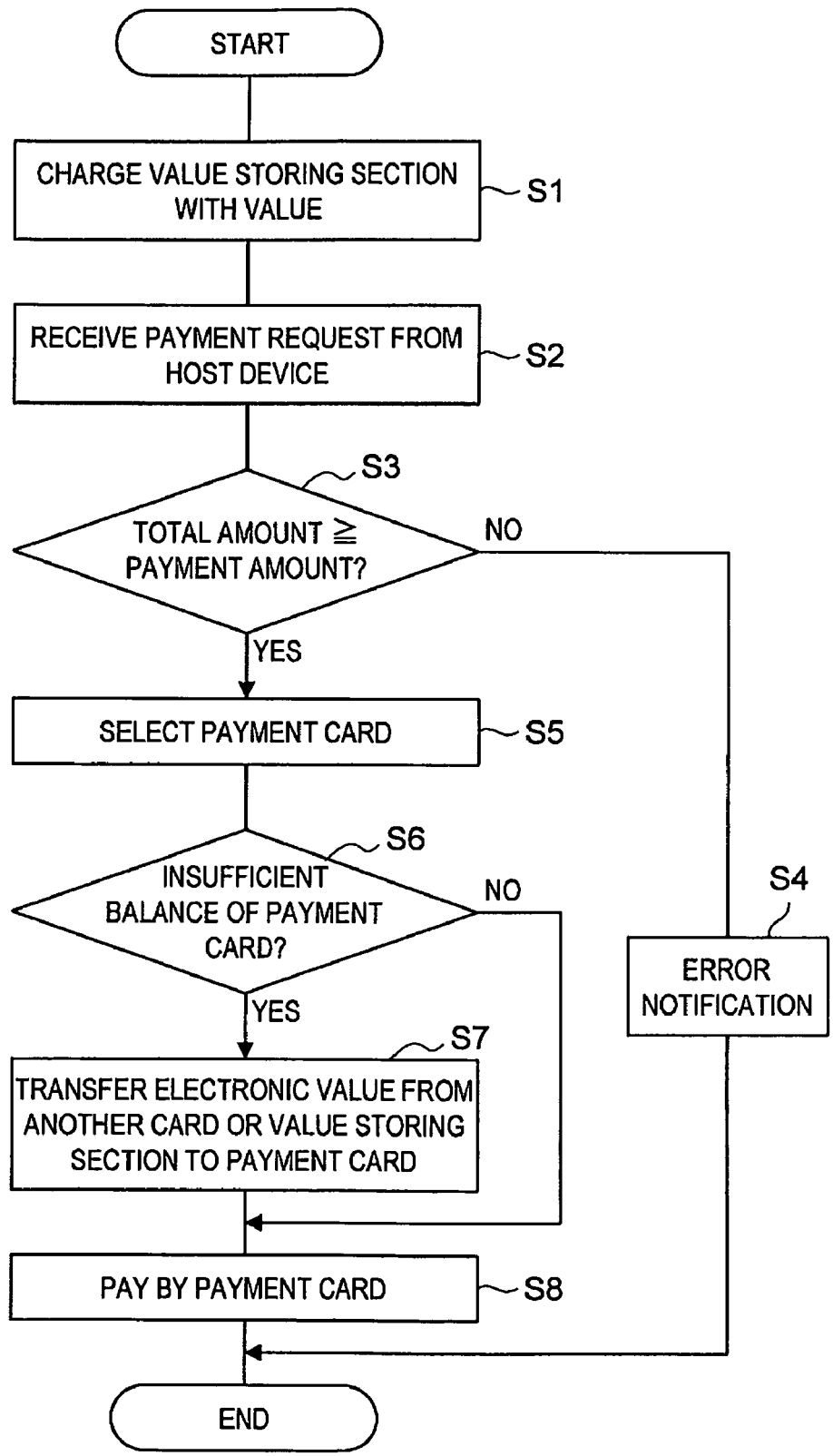
FIG. 7 is a flowchart showing a method of using electronic value in the electronic wallet device according to the embodiment.

Referring now to FIG. 7, the processing flow of the method of using electronic value in the electronic wallet device 10 according to the embodiment is described hereinbelow. FIG. 7 is the flowchart showing the method of using electronic value in the electronic wallet device 10 according to the embodiment.

As shown in FIG. 7, a user holds the electronic wallet device 10 over the reader/writer 21 of the host device 20 in order to charge the electronic wallet device 10 with electronic value, and the control section 110 of the electronic wallet device 10 charges the value storing section 108 with a prescribed amount of electronic value by performing non-contact communication with the reader/writer 21 of the host device 20 (step S1).

Next, the user holds the electronic wallet device 10 over the reader/writer 21 of the host device 20 at the time of purchasing a product at a store or the like, and the control section 110 receives, from the host device 20, a payment request for the amount corresponding to the purchase price concerning electronic money of the electronic money service to which the host device 20 corresponds (step 2).

Then, the control section 110 performs the above-described total value determination to determine whether the total value in the electronic wallet device 10 is equal to or hither than the prescribed amount requested to be paid (step S3). Specifically, the control section 110 calculates the total amount (total value) of electronic value stored in the value storing section 108 of the electronic wallet device 10 and the electronic value stored in one or two or more non-contact type IC cards 1 in the holding section 102, and compares the total value with the prescribed amount. If, as result, the total value is smaller than the prescribed amount, the payment cannot be made with the current charge amount in the electronic wallet device 10. Thus, the electronic wallet device 10 gives error notification to a user by performing error display such as "insufficient balance" on the display section 104 (step S4) to prompt a user to perform charging. On the other hand, if the total value is equal to or larger than the prescribed amount, the payment can be made with the electronic wallet device 10, and the process proceeds to the step S5.

After that, the control section 110 selects the non-contact type IC card 1 to be used in communication with the reader/writer 21 of the host device 20, which is the non-contact type IC card 1 to execute the payment of the prescribed amount (which is hereinafter referred to as the payment card), from a plurality of non-contact type IC cards 1 held in the holding section 102 (step S5). Specifically, the control section 110 checks the code (such as service code and system code) contained in the payment request transmitted from the host device 20 against the code of each non-contact type IC card 1 registered in the card information database 120, and selects the non-contact type IC card 1 which corresponds to the service provided by the host device 20 as a payment card. If there are a plurality of the same kind of the non-contact type IC cards 1, the control section 110 may automatically select the card with the largest/smallest balance of the electronic value or the like, or a user may manually select such a card in response to the selection direction from the electronic wallet device 10. The step S5 and the step S3 may be performed in any order.

Further, the control section 110 performs the above-described individual value determination to determine whether the electronic value in the selected payment card is equal to or hither than the prescribed amount requested to be paid (step S6). Specifically, the control section 110 compares the electronic value stored by the payment card with the prescribed amount to determine whether the balance of the electronic value charted in the payment card is insufficient or not. If, as a result, the electronic value stored in the payment card is equal to or larger than the prescribed amount, the payment can be made with the payment card only and there is no need to transfer the electronic value, and therefore the process proceeds to S8. On the other hand, if the electronic value stored in the payment card is smaller than the prescribed amount, the balance of the electronic value is insufficient and the payment cannot be made with the payment card only, and the process proceeds to S7.

After that, the control section 110 transfers at least the insufficient amount of electronic value to the payment card from another non-contact type IC card 1 and/or the value storing section 108 (step S7). For example, if the electronic value that is equal to or larger than the insufficient amount is stored in the value storing section 108, the control section 110 transfers the electronic value from the value storing section 108 to the payment card. Further, if the electronic value stored in the value storing section 108 is smaller than the insufficient amount, the control section 110 transfers the electronic value stored in another non-contact type IC card 1 in the holding section 102 to the value storing section 108 and further transfers the sufficient amount of electronic value from the value storing section 108 to the payment card. As a result of such transfer, the electronic value stored in the payment card increases to the amount that is equal to or larger than the requested prescribed amount.

Then, the control section 110 makes control so as to pay the prescribed amount of electronic value to the host device 20 using the electronic value stored in the payment card (step S8). Specifically, the control section 110 directs the payment card in the holding section 102 to execute the payment processing of the prescribed amount of electronic value. In response to the direction from the control section 110, the payment card transmits/receives the command or data concerning the payment of electronic value to/from the reader/writer 21 and reduces the electronic value stored therein by the prescribed amount.

Figure 8:
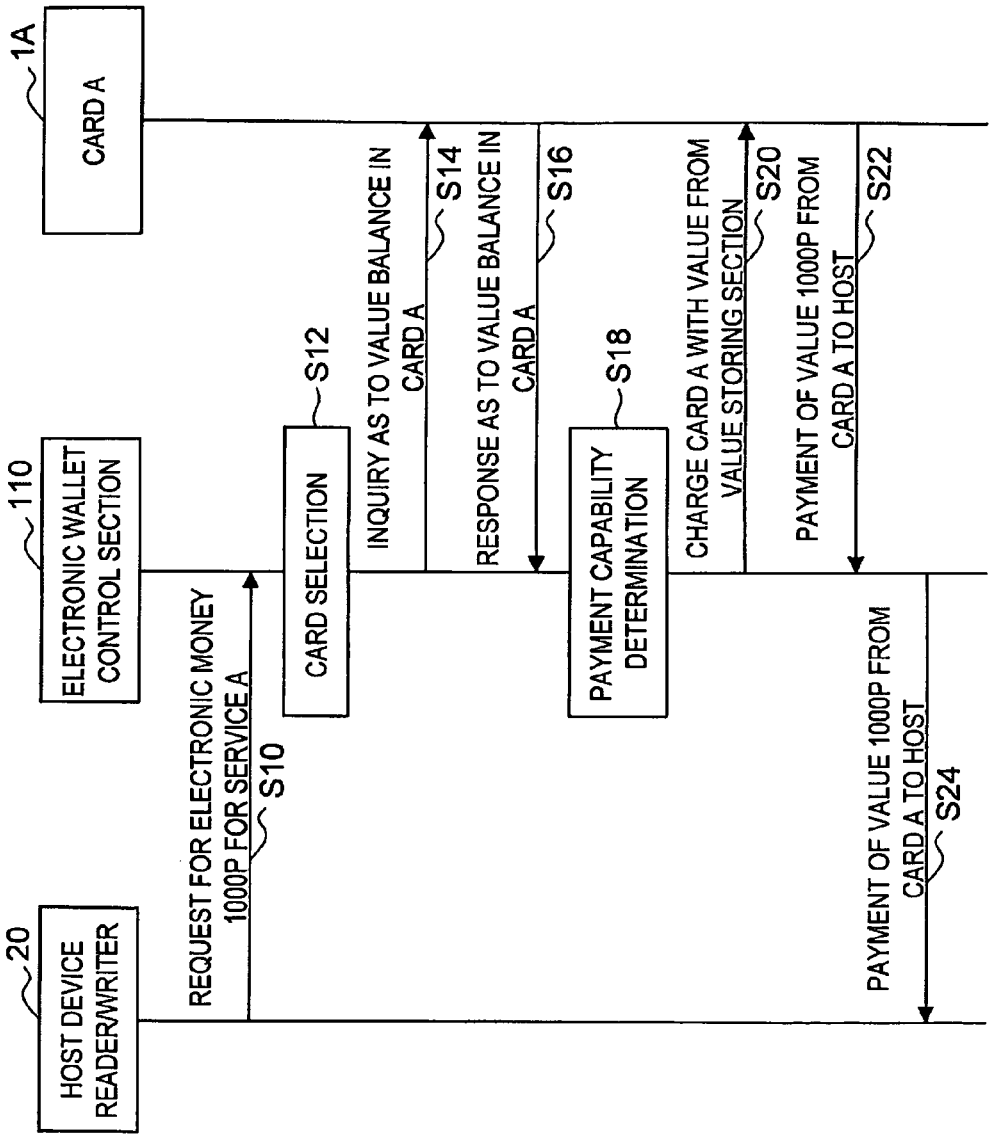
FIG. 8 is a sequence chart showing an example of payment processing of electronic value using the electronic wallet device according to the embodiment.

Next, referring to FIG. 8, an example of electronic value payment process in the electronic wallet device 10 of the embodiment is described hereinafter in detail. FIG. 8 shows the case of paying electronic value to the host device 20 after charging the non-contact type IC card 1A with electronic value from the value storing section 108 when the balance of the electronic value in the non-contact type IC card 1A corresponding to the electronic money service A is insufficient.

As shown in FIG. 8, the reader/writer 21 of the host device 20 transmits a payment request of a prescribed amount (1000 points) of electronic money which corresponds to the electronic money service A to the electronic wallet device 10 (step S10). In response to the payment request from the reader/writer 21, the control section 110 of the electronic wallet device 10 selects the non-contact type IC card 1A which corresponds to the electronic money service A (which is hereinafter referred to as the electronic money card A) from a plurality of non-contact type IC cards 1A to 1C which are held in the holding section 102, as a payment card to execute payment of electronic value (step S12).

Next, the control section 110 transmits a command for inquiring as to the balance of the electronic value stored in the electronic money card A to the electronic money service A (step S14), and receives the response as to the balance (e.g. 600 points) from the electronic money card A (step S16). If the electronic wallet device 10 acquires the balance of the electronic value in the electronic money card A prior to the occurrence of transaction (before receiving the payment request) and registers it into the card information database 120, the above-described balance inquiry processing (steps S14 and S16) can be eliminated.

Then, the control section 110 compares the balance of the electronic value stored in the electronic money card A with the above-described requested payment amount to determine whether the payment of the requested payment amount can be made with the electronic money card A only (step S118). For example, the balance of the electronic value in the electronic money card A (600 points) is smaller than the requested payment amount (1000 points), it is determined that the payment cannot be made. If it is determined that the electronic money card A contains the electronic value that is equal to or larger than the requested payment amount, the electronic value transfer processing in the subsequent step S20 can be eliminated.

If it is determined that the payment cannot be made as a result of the determination in S18, the control section 110 transfers the electronic value from the value storing section 108 to the electronic money card A according to the requested payment amount and the electronic value balance in the electronic money card A (step S20). Consequently, the requested payment amount of electronic value can be paid to the host device 20 from the electronic money card A via the electronic wallet device 10 (steps S22 and S24). The electronic value payment processing is performed by decreasing the amount of electronic value stored in the electronic money card A by the requested payment amount and transmitting the notification to the host device 20.

The amount of electronic value to be transferred from the value storing section 108 to the electronic money card A in the step S20 may satisfy the relationship of "(value balance in the card A+value amount to be transferred to the card A from the value storing section 108)>requested payment amount". In the illustrated example, the amount of electronic value to be transferred from the value storing section 108 to the electronic money card A may be 400 (=1000–600) points or more. The electronic value amount which remains after the payment with the electronic money card A is kept in the electronic money card A or the value storing section 108.

Figure 9:
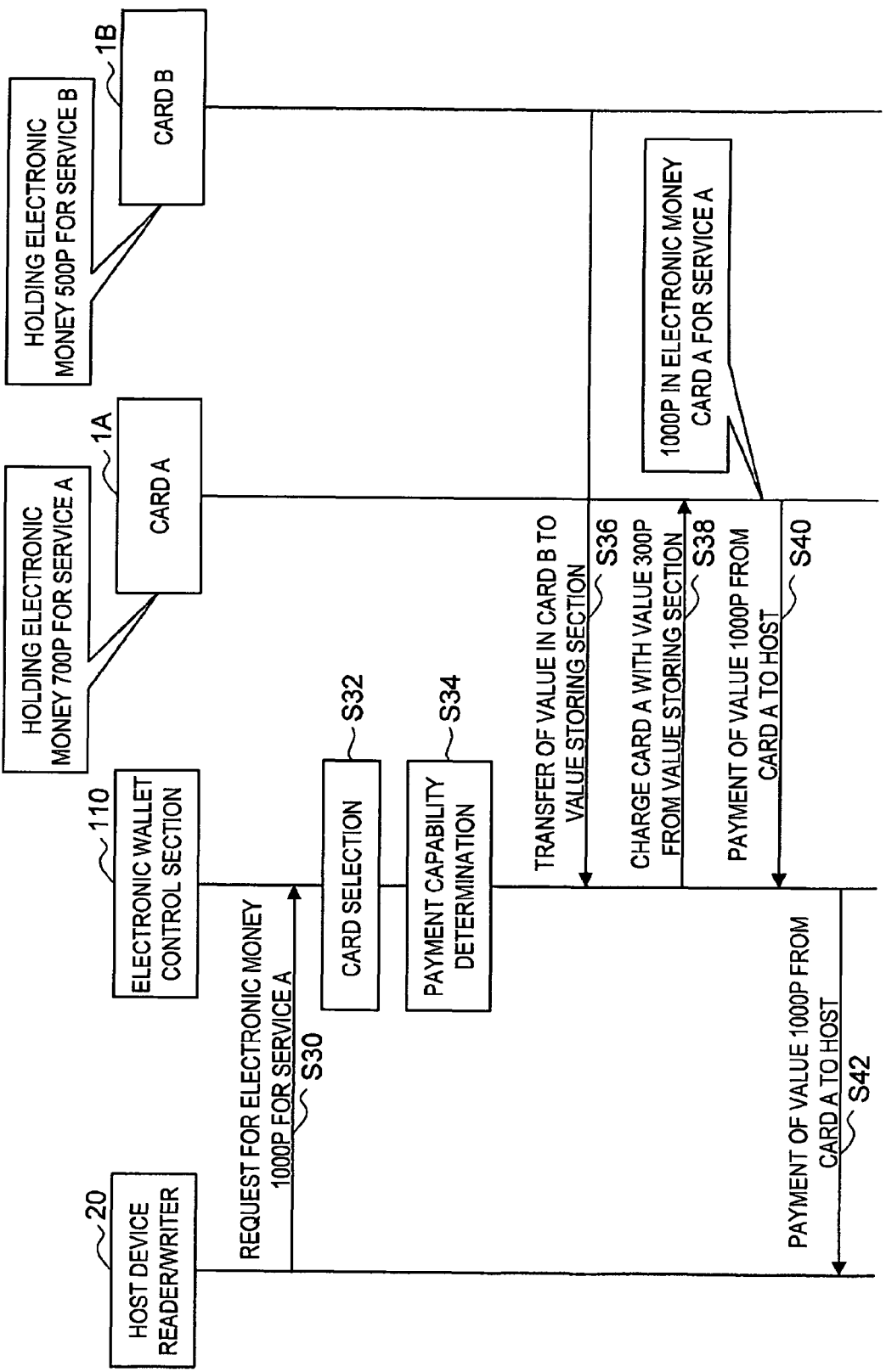
FIG. 9 is a sequence chart showing another example of payment processing of electronic value using the electronic wallet device according to the embodiment.

Next, referring to FIG. 9, another example of electronic value payment process in the electronic wallet device 10 of the embodiment is described hereinafter in detail. FIG. 9 shows the case of paying electronic value using the same kind of non-contact type IC cards 1A and 1B which correspond to the same electronic money service A. The non-contact type IC cards 1A and 1B pre-store the electronic value of 700 and 500 points, respectively, in this example.

As shown in FIG. 9, the reader/writer 21 of the host device 20 transmits a payment request for a prescribed amount (1000 points) concerning the electronic money which corresponds to the electronic money service A to the electronic wallet device 10 (step S30). In response to the payment request from the reader/writer 21, the control section 110 of the electronic wallet device 10 selects the plurality of non-contact type IC cards 1A and 1B which correspond to the electronic money service A (which are hereinafter refereed to as the electronic money cards A and B, respectively) from the plurality of non-contact type IC cards 1A to 1C which are held in the holding section 102, as candidates of the payment card to execute payment of electronic value (step S32).

Then, the control section 110 compares the balance of the electronic value stored in each of the electronic money cards A and B with the requested payment amount to determine whether the requested payment amount can be paid with either one of the electronic money card A or B (S34). For example, because the balance of the electronic value stored in each of the electronic money cards A and B (700 and 500 points, respectively) is smaller than the above-described requested payment amount (1000 points) in the illustrated example, it is determined that the payment cannot be made only with either one of the electronic money card A or B. In such a case, an existing system fails to pay the value by adding up the electronic value of the electronic money cards A and B even if the total amount of electronic value in the electronic money cards A and B (1200 points) is larger enough for the payment. On the other hand, the embodiment enables the payment by transferring the electronic value between the electronic money cards A and B via the value storing section 108 and adding up the transferred electronic value of the both cards.

Specifically, the control section 110 first selects the electronic money card A having the largest balance, for example, from the electronic money cards A and B which correspond to the above-described service A. Next, the control section 110 calculates the insufficient amount of electronic value (300 points) in the electronic money card A based on the requested payment amount (1000 points) and the balance of the electronic value in the electronic money card A (700 points). Then, the control section 110 transfers the electronic value that is equal to or larger than the insufficient amount (e.g. 300 points) from the electronic money card B to the value storing section 108 (step S36) and further transfers the electronic value that is equal to or larger than the insufficient amount (e.g. 300 points) from the value storing section 108 to the electronic money card A (step S38). As a result, the amount of electronic value stored in the electronic money card A increases (1000 points), so that the requested payment amount of electronic value can be paid from the electronic money card A to the host device 20 via the electronic wallet device 10 (steps S40 and S42).

As described in the foregoing, it is possible to add up the electronic value stored in the same kind of the electronic money cards A and B by transferring the electronic value between the electronic money cards A and B via the value storing section 108, thereby executing the payment to the host device 20 within the range of the total amount of electronic value.

Although electronic value is transferred between the plurality of electronic money cards A and B which correspond to the same service A in the example of FIG. 9, the present invention is not limited thereto. For example, electronic value may be transferred between the plurality of non-contact type IC cards 1 which correspond to different services (which is, between different kinds of the non-contact type IC cards 1). This further increases the degree of convenience for users who possess a plurality of different kinds of the non-contact type IC cards 1.

Further, although the payment is made using the electronic money card A which has a larger electronic value balance when the same kind of the electronic money cards A and B are held in the electronic wallet device 10 in the example of FIG. 9, the present invention is not limited thereto. For example, the payment may be made using the electronic money card B which has a smaller electronic value balance, or the equal amount may be paid using the plurality of electronic money cards A and B.

Figure 10:
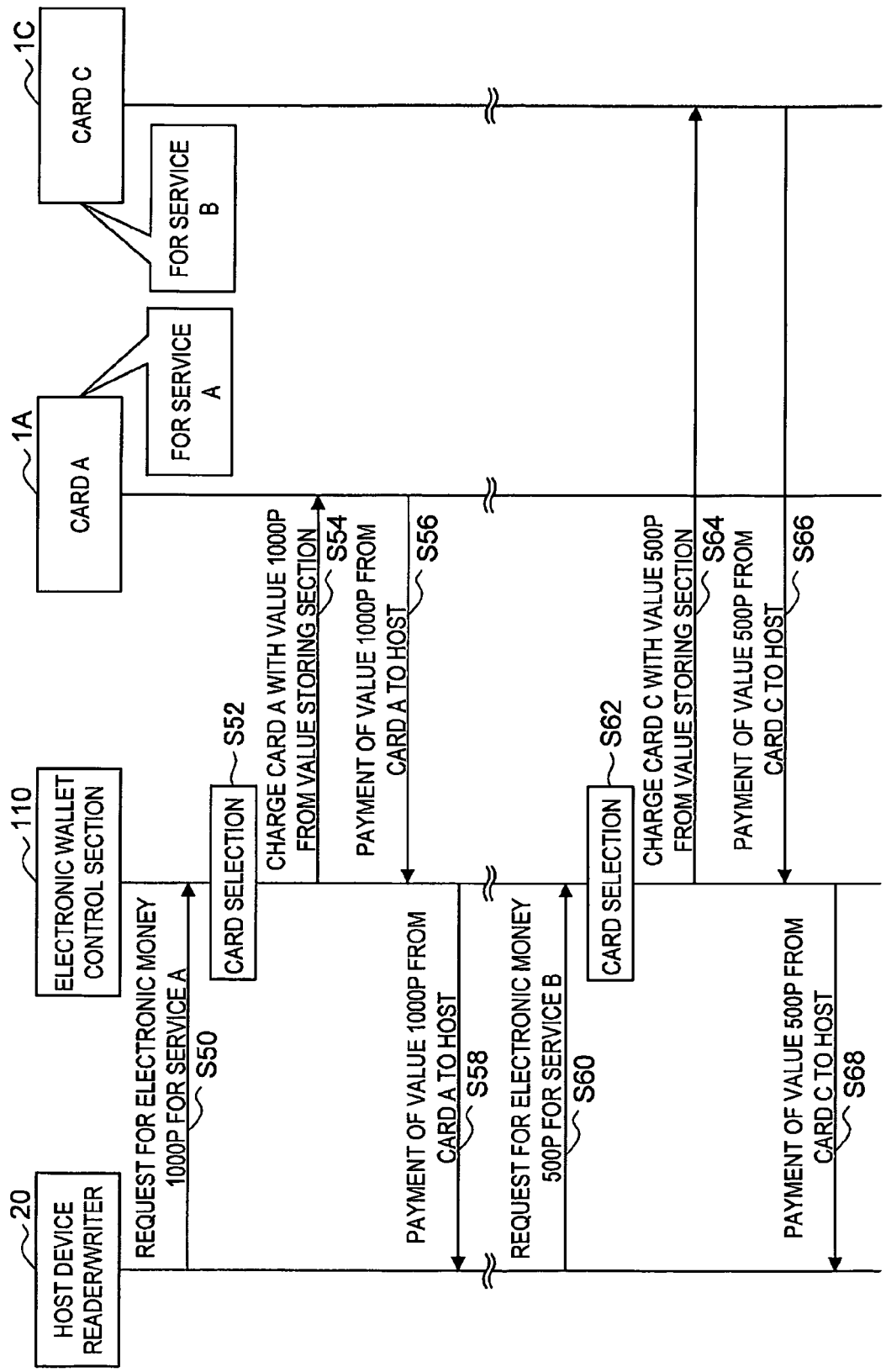
FIG. 10 is a sequence chart showing another example of payment processing of electronic value using the electronic wallet device according to the embodiment.

Referring then to FIG. 10, another example of electronic value payment process in the electronic wallet device 10 of the embodiment is described hereinafter in detail. FIG. 10 shows the case where electronic value is paid with use of the different kinds of the non-contact type IC cards 1A and 1C which correspond to the different kinds of electronic money services A and B, respectively. The non-contact type IC cards 1A and 1C are not charged with any electronic value, and the value storing section 108 of the electronic wallet device 10 is charged with the sufficient amount of electronic value in this example.

As shown in FIG. 10, firstly, the reader/writer 21 of the host device 20 transmits the payment request of a prescribed amount (1000 points) for the electronic money corresponding to the electronic money service A to the electronic wallet device 10 (step S50). In response to the payment request, the control section 110 of the electronic wallet device 10 selects the non-contact type IC card 1A which corresponds to the electronic money service A (which is hereinafter referred to as the "electronic money card A") as a payment card from the plurality of non-contact type IC cards 1A to 1C held in the holding section 102 (step S52).

Then, the control section 110 transfers the electronic value corresponding to the requested payment amount (1000 points) from the value storing section 108 to the electronic money card A, as the electronic money for the electronic money service A (step S54). As a result, the requested payment amount of electronic value (1000 points) can be paid to the host device 20 from the electronic money card A via the electronic wallet device 10 (steps S56 and S58).

Next, the reader/writer 21 of the host device 20 transmits the payment request of a prescribed amount (500 points) for the electronic money corresponding to the electronic money service B to the electronic wallet device 10 (step S60). In response to the payment request, the control section 110 of the electronic wallet device 10 selects the non-contact type IC card 1C which corresponds to the electronic money service B (which is hereinafter referred to as the "electronic money card C") as a payment card from the plurality of non-contact type IC cards 1A to 1C held in the holding section 102 (step S62).

Then, the control section 110 transfers the electronic value corresponding to the requested payment amount (500 points) from the value storing section 108 to the electronic money card C, as the electronic money for the electronic money service B (step S64). As a result, the requested payment amount of electronic value (500 points) can be paid to the host device 20 from the electronic money card C via the electronic wallet device 10 (steps S66 and S68).

As described in the foregoing, when the electronic money cards A and C which correspond to the different services A and B are inserted into the holding section 102 of the electronic wallet device 10, it is possible to charge each of the electronic money cards A and C with electronic value from the value storing section 108 and pay the electronic value as the electronic money for the different services A and B.

The electronic wallet device 10 according to this embodiment and a method of using electronic value and a transaction method with use of the electronic wallet device 10 are described in the foregoing. According to the embodiment, the electronic wallet device 10 includes the value storing section 108 which functions as a cache for electronic value for various kinds of services, so that electronic value can be flexibly transferred between the value storing section 108 and the non-contact type IC card 1 regardless of the kind of service to which the electronic value belongs.

The electronic wallet device 10 can thereby flexibly cope with a plurality of non-contact type IC cards 1 which correspond to the same or different kinds of services, and thus collectively manage electronic value to be used for a plurality of services. This allows flexible coping with the use of the same or different kinds of the non-contact type IC cards 1, which increases convenience for users who have a plurality of non-contact type IC cards 1.

This addresses the issue that electronic money cannot be used when paying for a product or the like because the value of each single electronic money card is insufficient in spite that the total value (balance) of a plurality of electronic money cards is sufficient. Further, this eliminates the need for a user to manage the value of each electronic money card for each of a plurality of kinds of electronic money services, which provides convenience in use. It is thereby possible to spread the use of the non-contact type IC card 1 such as an electronic money card.

Further, according to the embodiment, a user can carry a plurality of non-contact type IC cards 1 collectively by holding them in the electronic wallet device 10. At the time of using the non-contact type IC card 1, a user simply holds the electronic wallet device 10 over the reader/writer 21 of the host device 20, and the electronic wallet device 10 automatically selects the non-contact type IC card 1 which is appropriate for use in communication with the reader/writer 21 and establishes communication between the non-contact type IC card 1 and the reader/writer 21. At this time, only the selected non-contact type IC card 1 can suitably communicate with the reader/writer 21 without being interfered by the other non-contact type IC cards 1.

Because the electronic wallet device 10 selects only one appropriate non-contact type IC card 1 and establishes communication with the reader/writer 21, it is possible to execute communication appropriately between the selected non-contact type IC card 1 and the reader/writer 21 regardless of whether each non-contact type IC card 1 held therein or the reader/writer 21 supports the anti-collision function. This allows a user to carry a plurality of non-contact type IC cards 1 collectively and use them even if the cards do not support the anti-collision function.

It should be understood by those skilled in the art that various modifications, combinations, sub-combinations and alterations may occur depending on design requirements and other factors insofar as they are within the scope of the appended claims or the equivalents thereof.

For example, although the electronic wallet device 10 of the above-described embodiment is configured in a single unit, the present invention is not limited thereto. For example, the electronic wallet device can be combined with a portable terminal such as a mobile phone, a personal digital assistant (PDA), an electronic organizer, or a portable video/audio player.

Further, the electronic wallet device 10 according to the above-described embodiment has a housing structure that inserts three non-contact type IC cards 1A to 1C in parallel in the same direction. However, the number of non-contact type IC cards which can be held in the electronic wallet device, the direction of insertion, the location of held cards and so on are not limited to those described in the above embodiment.

Furthermore, the case of paying a requested amount of electronic money requested by the host device 20 with use of the electronic wallet device 10 which holds a plurality of electronic money cards is mainly described in the above-described embodiments. However, the present invention is not limited thereto. For example, the present invention may be applied to the case of paying a transportation fee to an automatic transportation ticket gate with use of the electronic wallet device 10 which holds a plurality of transportation fee cards, the case of exchanging electronic value concerning a point or a coupon with the host device 20 with use of the electronic wallet device 10 which holds a plurality of point/coupon cards and so on.

What is claimed is:

1. An electronic wallet device using an electronic value concerning a prescribed service by means of a non-contact type IC card capable of non-contact communication with an external unit, comprising:
   a holding section to hold a plurality of non-contact type IC cards;
   an external communication antenna to perform non-contact communication with the external unit;
   a card communication antenna to perform non-contact communication with the plurality of non-contact type IC cards held in the holding section;
   a value storing section capable of storing the electronic value; and
   a control section to receive a transaction request concerning the service from the external unit via the external communication antenna and, in response to the transaction request, transfer the electronic value between the value storing section and at least one of the plurality of non-contact type IC cards via the card communication antenna.

2. The electronic wallet device according to claim 1, wherein
   the electronic value stored in each non-contact type IC card is designated electronic value specific to a service to which each non-contact type IC card corresponds; and
   the electronic value stored in the value storing section is general electronic value common to a plurality of services.

3. The electronic wallet device according to claim 2, wherein
   the control section transfers the electronic value stored in the plurality of non-contact type IC cards to the value storing section and adds up the transferred electronic value to determine the general electronic value common to the plurality of services.

4. The electronic wallet device according to claim 1, wherein
   the control section receives a payment request of a prescribed amount of electronic value from the external unit via the external communication antenna and, in response to the payment request, transfers the electronic value from the value storing section to a non-contact type IC card selected from the plurality of non-contact type IC cards and controls the selected non-contact type IC card to pay the prescribed amount of electronic value to the external unit.

5. The electronic wallet device according to claim 4, wherein
   the control section determines whether designated electronic value stored in the selected non-contact type IC card is equal to or larger than the prescribed amount and, if the electronic value is smaller than the prescribed amount, transfers general electronic value stored in the value storing section to the selected non-contact type IC card.

6. The electronic wallet device according to claim 4, wherein
   the control section determines whether first designated electronic value stored in the selected non-contact type IC card is equal to or larger than the prescribed amount and, if the electronic value is smaller than the prescribed amount, transfers second designated electronic value stored in another non-contact type IC card to the selected non-contact type IC card via the value storing section.

7. A method of using electronic value concerning a prescribed service in an electronic wallet device including a holding section to hold a plurality of non-contact type IC cards capable of non-contact communication with an external unit, an external communication antenna to perform non-contact communication with the external unit, a card communication antenna to perform non-contact communication with the plurality of non-contact type IC cards held in the holding section, and a value storing section capable of storing an electronic value, the method comprising:

receiving a transaction request concerning the service from the external unit via the external communication antenna; and transferring the electronic value between the value storing section and at least one of the plurality of non-contact type IC cards via the card communication antenna in response to the transaction request.

* * * * *